Dec. 8, 1931.  W. G. HAGMAIER ET AL  1,835,041
EDGER SHIFTER
Original Filed May 18, 1928
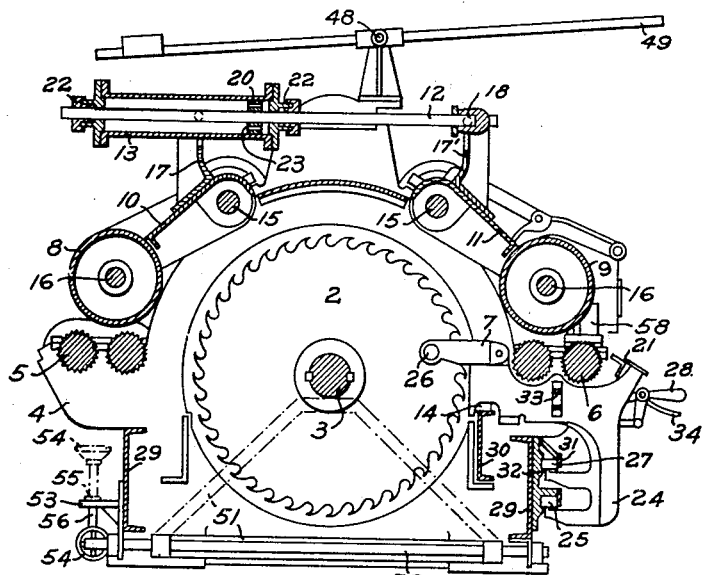
Fig. 1
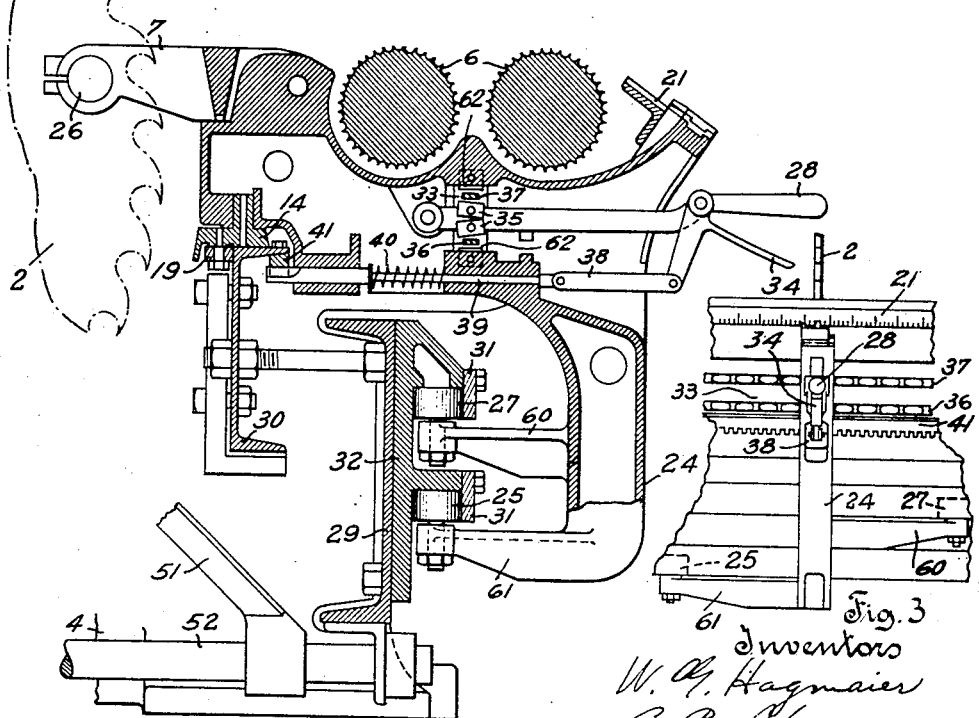
Fig. 2
Fig. 3
Inventors
W. G. Hagmaier
E. C. Shaw
by
Attorney Patented Dec. 8, 1931

1,835,041

UNITED STATES PATENT OFFICE

WILLIAM G. HAGMAIER, OF WEST ALLIS, AND ERNEST C. SHAW, OF MILWAUKEE, WISCONSIN, ASSIGNORS TO ALLIS-CHALMERS MANUFACTURING COMPANY, OF MILWAUKEE, WISCONSIN, A CORPORATION OF DELAWARE

EDGER SHIFTER

Original application filed May 18, 1928, Serial No. 278,693. Patent No. 1,788,574. Divided and this application filed June 26, 1930. Serial No. 463,974.

The present invention relates generally to improvements in saw mill machinery, and relates more specifically to improvements in the construction and operation of saw mill edgers.

An object of the invention is to provide various improvements in the details of construction of saw mill edgers or the like, whereby the operation of such machines is facilitated and by virtue of which the life thereof is prolonged. Another object of the invention is to provide new and useful improvements in edger press roll adjusting and cushioning mechanisms. A further object of the invention is to provide simple, compact and efficient mechanism for effecting adjustment or lateral shifting of the individual saws of an edger. Another object of the invention is to provide improved instrumentalities for facilitating removal of edger saws or the like, from an arbor. Still another object of the invention is to provide an edging machine which is especially adapted to withstand the wear and tear of hard usage resulting from relatively heavy work. These and other objects and advantages will appear from the following description.

This application is a division of our application Serial Number 278,693, filed May 18, 1928, Patent Number 1,788,574.

A clear conception of embodiments of the various features constituting the present improvement and of the mode of constructing and of operating edgers built in accordance therewith, may be had by referring to the drawings accompanying and forming a part of this specification in which like reference characters designate the same or similar parts in the various views.

Fig. 1 is a central vertical section through the edger.

Fig. 2 is an enlarged transverse vertical section through one of the saw shifting mechanisms of the edger, in the plane of the cooperating saw, the section being interrupted for the sake of clearness.

Fig. 3 is a front detail view of a shifter, in place.

The improved edger comprises in general a main frame consisting of end frames 4 and channel bars 29, 30 interconnecting the end frames; a rotary saw arbor 3 mounted horizontally in bearings associated with the end frames 4; a plurality of circular saws 2 rotatable by the arbor 3 and adjustable longitudinally therealong; mechanism for independently adjusting the saws 2 along the arbor 3; means for transporting the material being cut toward and away from the saws 2; a pair of press rolls 8, 9 coacting with the material to urge the same against the transporting means; and mechanism for adjusting and for cushioning the press rolls. The arbor 3 and the saws 2 are rotatable in a well known manner by means of transmission mechanism or a motor associated with one end of the arbor, and the saws are rotatable in a clockwise direction as viewed in Fig. 1.

The improved saw shifting or adjusting mechanism shown in detail in Fig. 2 comprises a series of shifter brackets 24 movable longitudinally of the channel bars 29, 30 and carrying shifter arms 7 having bifurcations straddling the saws 2 and provided with blocks 26 which are engageable with the sides of the saw blades during shifting. Each of the brackets 24 is provided with laterally extending arms 60 and 61. The upper arm 60 carries a guide roller 27 cooperating with an upper guide bar 31 secured to a guide bracket 32 associated with the channel bar 29, and the lower arm 61 carries a similar guide roller 25 cooperating with another guide bar 31 associated with the bracket 32, as shown in Fig. 2. The portion of the bracket 24 closely adjacent to the saw, is provided with a shoe 14 which rests upon the upper surface of the channel bar. This shoe also carries a roller 19 which coacts with the inner side surface of the channel bar 30 and forms means for preventing outward displacement of the shifter bracket 24. The rollers 19, 25, 27 provide a three point anti-friction support for each of the shifter brackets 24. The lower portion of the upper flange of the channel bar 30 is provided with a notched strip 41 with the notches of which a locking bar 39 is engageable in order to positively lock the shifter in adjusted position closely adjacent to the saws. The locking bar 39 is normally urged into locking engagement by means of a spring 40, and may be retracted from engagement with the strip 41 by means of a handle 34 pivotally associated with the shifter handle 28 and operatively connected to the rod 39 by means of a link 38.

The brackets 24 are laterally shiftable along the channel bars 29, 30 by virtue of their cooperation with a constantly traveling power driven chain 33 having upper and lower stretches or runs 37, 36 respectively, extending longitudinally in front of the edger and passing through transverse openings in the brackets 24. It will be apparent that when the chain 33 is driven, the upper run 37 will travel in one direction, and the lower run 36 will simultaneously travel in the opposite direction, so that if a bracket 24 is connected with either of the chain runs, it may be automatically shifted in a desired direction, thereby simultaneously shifting the corresponding saw 2 along the arbor 3. The shifter actuating lever 28 is pivotally associated with the bracket 24 and extends between the chain runs. The lever 28 is provided with clamping grip blocks 35 which upon movement of the lever 28 in a vertical plane are engageable with the adjacent surfaces of the chain runs 36, 37. The bracket 24 is provided with other grip blocks 62 located in vertical alinement with the grip blocks 35 of the lever 28, and cooperable with the outer surfaces of the chain runs 37, 36. The arrangement is obviously such that when the lever 28 is shifted vertically and the locking bar 39 has been retracted, either of the chain runs 36, 37 may be firmly gripped between the adjacent grip blocks of the lever 28 and of the bracket 24, thereby causing the bracket to shift laterally. By virtue of the anti-friction supports afforded by the rollers 19, 25, 27, the brackets 24 may also be readily shifted manually by merely applying horizontal pressure to the levers 28. The degree of shifting may be readily determined by means of a gage 21 disposed at the front of the mechanism.

The mechanism for transporting the material toward and away from the saws 2 comprises rear and front feed rolls 5, 6 respectively, which are being constantly rotated during operation of the machine. Above these feed rolls, the press rolls 8, 9 are adjustably disposed, the press rolls being relatively heavy in structure so as to urge the material in contact with the corrugated feed rolls to thereby insure positive transportation of the material. The press rolls 8, 9 are swingably supported from pivots 15 by means of arms 10, 11 and may be raised away from the feed rolls by any suitable means.

A cushioning device for preventing free falling of the rolls is provided at the medial portions of the press rolls. This cushioning device comprises a cylinder 13 pivotally associated at its medial portion with a bracket 17 which is rigidly secured to one of the press roll carrier arms 10. Located within the cylinder 13 is a piston 20 secured to a pistod rod 12, the outer end of which is secured to a pivot block 18. The piston 20 is provided with one or more relatively small through openings 23 for permitting the gradual passage of fluid confined within the cylinder 13, from one side of the piston 20 to the other. Stuffing boxes 22 cooperate with the rod 12 to prevent escape of fluid from within the cylinder 13. The block 18 is pivotally associated with a bracket 17' rigidly attached to the press roll carrier arm 11. The mechanism obviously functions to check the fall of the press rolls 8, 9 and to bring these rolls into gradual engagement with the material advancing over the feed rolls. The press rolls 8, 9 are rotatable about shafts 16 supported in bearings in the carrier arms 10, 11, and vertical guide rollers 58 adjacent the ends of the frame serve to prevent entering material from striking the frame.

Located beneath the medial portion of the edger, is a transverse shaft 52 which pivotally supports a bridge 51. With the edger in operation, the bridge lies flat against the floor as shown in solid lines in Fig. 1, but the bridge may be raised as shown in dot and dash, in order to provide a temporary support for the arbor 3 while the saws 2 are being removed from an end thereof. The bridge manipulating mechanism comprises a lever rod 56 having a threaded end with which an adjustable hand wheel 54 coacts. The hand wheel 54 is connected with a collar 55 which may be brought into engagement with a bracket 53 in order to raise the bridge 51 into contact with the arbor 3 after having been righted.

During normal operation of the edger the saws 2 are set in the proper position relatively to the arbor 3, this preferably being accomplished while the saws and the arbor are rotating. The material to be sawed is then advanced between the front feed rolls 6 and the corresponding press roll 9, whereupon it is fed rearwardly past the saws 2 and between the rear feed rolls 5 and the press roll 8, being delivered from the latter in sawed condition.

If it is desired to adjust one or more of the saws 2 longitudinally of the arbor 3, it is only necessary for the operator to grasp the lever 28 and the handle 34 and to initially release the lock by retracting the locking rod 39. Depending upon the direction in which the released saw is to be shifted, the operator subsequently either raises or lowers the lever 28, thereby causing the chain 33 to automatically shift the saw 2 in the desired direction until the shifting motion is stopped by return of the lever 28 to neutral position. The adjusted saw may then be locked in the new position by release of the lever 34, in an obvious manner. It will be apparent that the guide rollers 19, 25, 27 permit rapid shifting of the saws either by power or manually with minimum waste of effort, and the gage 21 provides simple means for determining the cut. The shoes 14 and rollers 19 carried by the brackets 24 closely adjacent to the saws, obviously prevent possible displacement of the shifter mechanism so as to produce buckling of the saws, and such buckling is also avoided by locating the locking mechanism or strip 41 closely adjacent to the saws. The three point support afforded by the rollers 19, 25, 27 eliminates all danger of movement of the shifters, and insures absolute rigidity thereof.

The bridge 51 provides simple and effective means for enabling rapid and safe insertion and removal of saws 2 without disturbing the arbor 3, and the rollers 58 insure proper delivery of the material to the machine.

It should be understood that it is not desired to limit the invention to the exact details of construction and operation herein shown and described for various modifications within the scope of the claims may occur to persons skilled in the art.

It is claimed and desired to secure by Letters Patent:

1. In combination, a saw, an arbor rotatably supporting said saw, a frame, a shifter movable along said frame to move said saw along said arbor axis, and a three point roller support for said shifter, one of said rollers being located in substantially the plane of said saw and coacting with a rear surface of said frame.

2. In combination, a saw, an arbor rotatably supporting said saw, a frame, a shifter movable along said frame to move said saw along said arbor axis, a roller carried by said shifter and coacting continuously with said frame closely adjacent to said saw, and a lock for said shifter located closely adjacent to said roller.

3. In combination, a saw, an arbor rotatably supporting said saw, a frame, a shifter movable along said frame to move said saw along said arbor axis, a roller carried by said shifter in substantially the plane of said saw and coacting continuously with a rear surface of said frame closely adjacent to said saw, and other rollers carried by said shifter on opposite sides of said plane and coacting with said frame remote from said saw.

4. In combination, a saw, an arbor rotatably supporting said saw, a frame, a shifter movable along said frame to move said saw along said arbor axis, a roller on said shifter bearing on a rear surface of said frame, and other rollers on said shifter bearing on a front surface of said frame.

5. In combination, a saw, an arbor rotatably supporting said saw, a frame, a shifter movable along said frame to move said saw along said arbor axis, a roller on said shifter bearing on a rear surface of said frame, other rollers on said shifter bearing on a front surface of said frame, and a lower surface of said shifter bearing on an upper surface of said frame.

In testimony whereof, the signatures of the inventors are affixed hereto.

WILLIAM G. HAGMAIER.
ERNEST C. SHAW.